May 12, 1959 C. K. STEDMAN ET AL 2,886,794

MICROPHONE

Filed Sept. 11, 1943

INVENTORS
CECIL K. STEDMAN
BY FREDERICK H. SMITH

ATTORNEY

United States Patent Office 2,886,794
Patented May 12, 1959

2,886,794
MICROPHONE

Cecil K. Stedman, Watertown, and Frederick H. Smith, East Natick, Mass., assignors to the United States of America as represented by the Secretary of the Navy Application September 11, 1943, Serial No. 502,077

3 Claims. (Cl. 340—11)

This invention relates to microphones and more particularly to a novel microphone of the magnetostriction type which is simple and compact in construction and is sensitive and directionally selective in operation.

One object of the present invention resides in the provision of a novel magnetostrictive microphone for use in detecting compressional waves of small intensity transmitted through water, which comprises a magnetostrictive tube disposed within a coil, and a magnet loosely mounted in the magnetostrictive tube and operatively connected to a diaphragm which also supports the tube.

Another object of the invention is to provide a microphone of the character described for use in directing an underwater vehicle and in which the diaphragm comprises a part of the wall of the vehicle hull defined by a ring or a plurality of concentric rings mounted on the inner surface of the wall of the hull.

A further object of the invention is to provide a novel magnetostrictive ventral microphone for use in automatically directed antisubmarine torpedoes to detect compressional waves of small intensity from the submarine, which is of rugged construction and occupies a relatively small space in the torpedo.

These and other objects of the invention may be better understood by reference to the accompanying drawing, in which—

Figure 1:
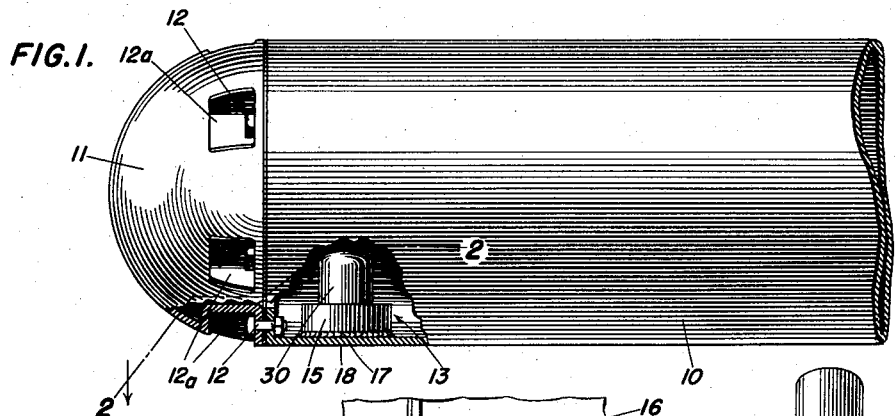
Fig. 1 is a side view, partly in section, of part of a torpedo employing one form of the new microphone.
Figure 2:
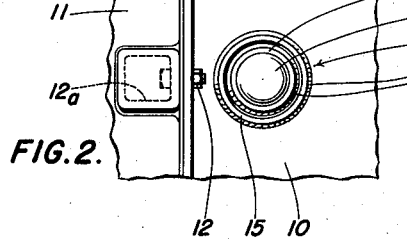
Fig. 2 is a sectional view on the line 2—2 in Fig. 1.
Figure 3:
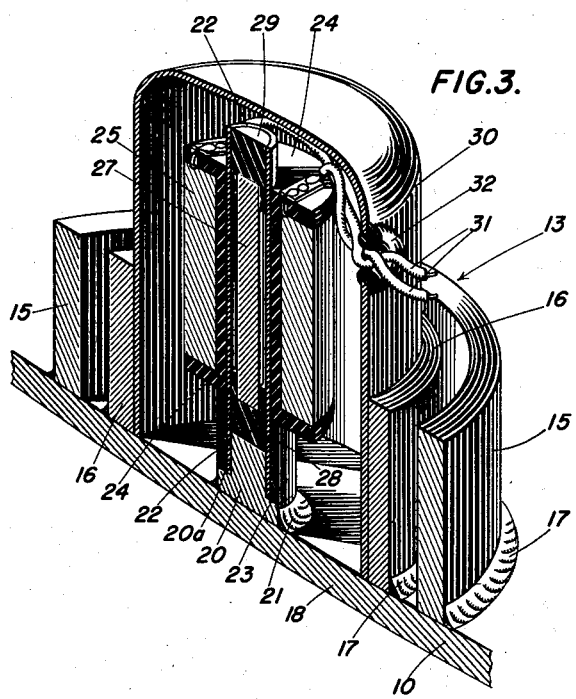
Fig. 3 is an enlarged, perspective, longitudinal sectional view of the microphone.
Figure 4:
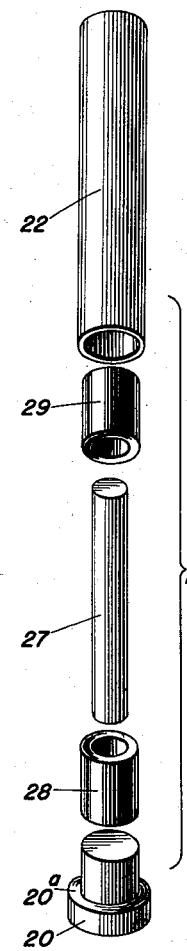
Fig. 4 is an exploded perspective view of the magnet and magnetostrictive tube assembly of the microphone.

While the microphone is adapted for various uses, it may be used to particular advantage in an electrically controlled depth-steering system for torpedoes, as disclosed in a copending application of C. K. Stedman et al., Serial No. 502,075, filed September 11, 1943. Accordingly, for illustrative purposes, the invention is shown in the form of a ventral microphone mounted in a torpedo in position to receive high-frequency compressional waves from below the horizontal plane of the torpedo.

Referring to the drawing, we have shown a torpedo having a cylindrical hull comprising a main section 10 and a generally hemispherical head 11. The head is connected to the main section 10 of the hull by means of bolts 12 spaced circumferentially about the head and disposed in recesses 12a which may be covered by suitable means (not shown) to provide a smooth surface. The microphone of the invention is shown generally at 13 and is mounted in the main section of the hull on the bottom thereof, so that the microphone is responsive to compressional waves received from below the hull.

The microphone comprises a pair of metal rings 15 and 16 secured to the inner wall of the hull in concentric, spaced relation, as by means of welding 17. The function of the rings 15 and 16 is to isolate a circular portion 18 of the hull so that the portion 18 acts as an independent diaphragm and is not influenced by compressional waves impinging upon the top of the hull and passing through the hull. That is, the diaphragm 18, because of the rings 15 and 16, is responsive only to compressional waves received from below the hull. The radii of the rings 15 and 16 are determined largely by theoretical computations and depend upon the nature and thickness of the wall of the hull and the frequency to which the microphone is to be responsive.

A metal button 20 is secured to the central portion of diaphragm 18 in concentric relation to the rings 15 and 16, as by welding 21. The button is provided with an external shoulder 20a, and seated at one end on the shoulder is a thin, nickel, magnetostrictive tube 22 extending upwardly from the button for a substantial distance, the reduced end portion of the button fitting closely in the adjacent end of the tube. A spacing collar 23 made of insulating material is seated on the button shoulder 20a around the lower end portion of the nickel tube, and the upper end of the collar supports an insulating spool 24. The spool fits loosely around the nickel tube 22 and has a coil of fine wire 25, the turns of which are insulated.

A bar magnet 27 is supported loosely in the nickel tube 22 in any suitable manner. As shown, the magnet 27 is considerably smaller in diameter than the tube 22, and the ends of the magnet are received in insulating caps 28 and 29 engaging the inner wall of the tube, the lower cap 28 resting on the free end of the button 20. Thus, the insulating caps 28 and 29 hold the magnet loosely on the axis of the nickel tube and in spaced relation to the walls of the tube.

The coil 25 and the nickel tube 22 are enclosed in a shield can 30 fitted closely in the inner ring 16. At its ends, the coil 25 is connected to lead wires 31 which extend outwardly from the shield can through an insulating grommet 32 mounted in an opening in the can.

In operation, compressional waves transmitted through the water against the bottom portion of the torpedo hull 10 causes a vibratory action in the isolated diaphragm 18. The compressional waves are transmitted from the diaphragm through the button 20 and into and along the nickel tube 22, causing corresponding stresses of alternating compression and tension along the length of the tube. The high frequency of the waves and the inertia of the tube 22 are such that a corresponding magnetostriction effect is produced in the tube. That is, the effect of these stresses is to generate a corresponding magnetic field in the tube 22 which is superimposed upon the relatively steady field due to the magnet 27 loosely mounted in the tube. To a great extent, the return path of the alternating flux from the tube is not through the magnet 27 but is through the air around coil 25. In other words, the alternating flux generated by the waves of compression and tension in the nickel tube 22 links with the coil 25 and generates a corresponding electromotive force therein. Thus, the energy of the compressional waves transmitted through the water against the ventral diaphragm 18 is received by the microphone and converted into electromotive forces in the coil 25. It will be apparent that the output of the coil 25 may be used in controlling the vertical steering of the torpedo in accordance with the intensity of the compressional waves received by the microphone from below the hull, as disclosed in the above-identified application, Serial No. 502,075.

The new microphone is compact and rugged and has relatively few parts. Because of the construction and arrangement of the parts, the microphone is capable of withstanding considerable shock without any adverse effect on its operation.

We claim:

1. A microphone comprising a diaphragm, a button secured to the central portion of the diaphragm, a magnetostriction tube on the button, a coil rigidly supported on the button and extending around the tube in closely adjacent relation thereto, a magnet in the tube, and a pair of insulating caps on the ends of the magnet for loosely mounting the magnet in the tube.

2. A microphone comprising a diaphragm, a button secured to the central portion of the diaphragm and having a shoulder, a magnetostriction tube seated on the shoulder and into one end of which a part of the button is closely fitted, a spool supported on said shoulder and fitted closely around the tube, a coil wound on the spool, a magnet in the tube, and insulating caps on the ends of the magnet for supporting the magnet loosely in the tube, one of said caps resting on said part of the button.

3. In combination with a hollow shell, a microphone in the shell for receiving sound in an optimum direction through the shell wall, the microphone comprising a magnetostriction tube, means for connecting one end of the tube to the shell wall, a coil extending around the tube, a magnet in the tube, and a plurality of guard rings each secured at one end to the shell, the rings extending around said tube in spaced relation thereto for isolating the tube from sounds travelling along the shell wall.

References Cited in the file of this patent

UNITED STATES PATENTS

| | | |
|---|---|---|
| 942,897 | Garrett et al. | Dec. 14, 1909 |
| 1,002,903 | Davison | Sept. 12, 1911 |
| 1,426,757 | Moore | Aug. 22, 1922 |
| 1,445,508 | Hahnemann et al. | Feb. 13, 1923 |
| 1,450,287 | Hahnemann | Apr. 3, 1923 |
| 2,063,950 | Steinberger | Dec. 15, 1936 |
| 2,153,571 | Kallmeyer | Apr. 11, 1939 |
| 2,170,206 | Mason | Aug. 22, 1939 |
| 2,415,407 | Benioff | Feb. 11, 1947 |

FOREIGN PATENTS

| | | |
|---|---|---|
| 405,613 | Great Britain | Jan. 26, 1934 |
| 101,140 | Switzerland | Mar. 18, 1941 |